United States Patent
Subramanian et al.

(10) Patent No.: US 9,258,253 B2
(45) Date of Patent: Feb. 9, 2016

(54) SYSTEM AND METHOD FOR FLEXIBLE SWITCHING FABRIC

(71) Applicant: Dell Products L.P., Round Rock, TX (US)

(72) Inventors: Krishnamurthy Subramanian, Mountain View, CA (US); Mohnish Anumala, Cupertino, CA (US); Geng Lin, Cupertino, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 199 days.

(21) Appl. No.: 13/893,609

(22) Filed: May 14, 2013

(65) Prior Publication Data

US 2014/0341225 A1 Nov. 20, 2014

(51) Int. Cl.
*H04L 12/28* (2006.01)
*H04L 12/933* (2013.01)
*H04L 12/931* (2013.01)

(52) U.S. Cl.
CPC .............. *H04L 49/10* (2013.01); *H04L 49/356* (2013.01)

(58) Field of Classification Search
CPC ................................................... H04L 12/933
USPC ........................................................ 370/401
See application file for complete search history.

(56) References Cited

U.S. PATENT DOCUMENTS

| | | | | |
|---|---|---|---|---|
| 7,406,038 B1* | 7/2008 | Oelke | ..................... | H04L 49/40 370/216 |
| 7,760,647 B2* | 7/2010 | Li | ........................... | H04L 47/10 370/229 |
| 8,542,586 B2* | 9/2013 | Chen | ....................... | H04L 47/22 370/225 |
| 2004/0255190 A1* | 12/2004 | Sidhu | ....................... | H04L 1/22 714/13 |
| 2008/0320117 A1* | 12/2008 | Johnsen | .................. | G06F 11/30 709/221 |
| 2010/0226385 A1* | 9/2010 | Rochon | .................. | H04L 45/00 370/419 |
| 2012/0250679 A1 | 10/2012 | Judge et al. | | |
| 2012/0287787 A1* | 11/2012 | Kamble | .................. | H04L 49/70 370/235 |
| 2013/0017863 A1* | 1/2013 | Kummetz | ............. | H04W 16/04 455/562.1 |

* cited by examiner

*Primary Examiner* — Dang Ton
*Assistant Examiner* — Abdeltif Ajid
(74) *Attorney, Agent, or Firm* — Haynes and Boone, LLP

(57) ABSTRACT

A system and method for a flexible switching fabric includes a network switching device. The network switching device includes a plurality of connectors configured to couple the network switching device to other network devices, one or more front panel cards, each front panel card including one or more first ports and configured to forward network packets between the first ports, one or more fabric cards, each fabric card including one or more second ports and configured to forward network packets between the second ports, and a port multiplexing unit configured to flexibly couple the connectors to the one or more first ports and the one or more second ports to the one or more first ports. The flexible coupling between the one or more first ports and the connectors and the one or more second ports is determined based on a desired configuration for the network switching device.

20 Claims, 8 Drawing Sheets

SYSTEM AND METHOD FOR FLEXIBLE SWITCHING FABRIC

The present disclosure relates generally to information handling systems, and more particularly to flexible switching fabrics.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often asked to continuously make forwarding decisions and to update forwarding information as network configurations change.

Many networks include extensive switching fabrics designed to interconnect large numbers of network switching products and networked devices so that large volumes of network traffic may be exchanged between the network switching products and the networked devices as well as with other network switching products and networked devices in more distant areas of the network. These switching fabrics are often found in data centers. It would be desirable for the switching fabrics to adapt and/or scale as the networking needs of the data centers change over time. This may occur as a result of increasing or decreasing network bandwidth requirements, the addition or removal of networked devices, changes in flow patterns in network traffic, etc.

Accordingly, it would be desirable to provide improved switching fabrics with a flexible architecture for data centers, information handling systems, and other network installations.

SUMMARY

According to one embodiment, a network switching device includes a plurality of connectors configured to couple the network switching device to other network devices, one or more front panel cards, each front panel card including one or more first ports and configured to forward network packets between the first ports, one or more fabric cards, each fabric card including one or more second ports and configured to forward network packets between the second ports, and a port multiplexing unit configured to flexibly couple the plurality of connectors to the one or more first ports and the one or more second ports to the one or more first ports.

According to another embodiment, a method of configuring a network switching device includes determining a desired configuration for the network switching device, determining first mappings between a plurality of connectors configured to couple the network switching device to other network devices and one more first ports of one or more front panel cards based on information associated with the desired configuration, determining second mappings between the one or more first ports and one or more second ports of one or more fabric cards based on information associated with the desired configuration, and provisioning a port multiplexing unit based on the first mappings and the second mappings. The provisioned port multiplexing unit couples the plurality of connectors to the first ports and the second ports to the first ports.

According to yet another embodiment, an information handing system includes a network switching device. The network switching device includes a plurality of connectors configured to couple the network switching device to other network devices, one or more front panel cards, each front panel card including one or more first ports and configured to forward network packets between the first ports, one or more fabric cards, each fabric card including one or more second ports and configured to forward network packets between the second ports, a port multiplexing unit configured to flexibly couple the plurality of connectors to the one or more first ports and the one or more second ports to the one or more first ports, and a unified provisioning system configured to provision the port multiplexing unit. The unified provisioning system is configured to determine a desired configuration for the network switching device, determine first mappings between the plurality of connectors and the one more first ports based on information associated with the desired configuration, determine second mappings between the one or more first ports and the one or more second ports based on information associated with the desired configuration, and provision the port multiplexing unit based on the first mappings and the second mappings.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
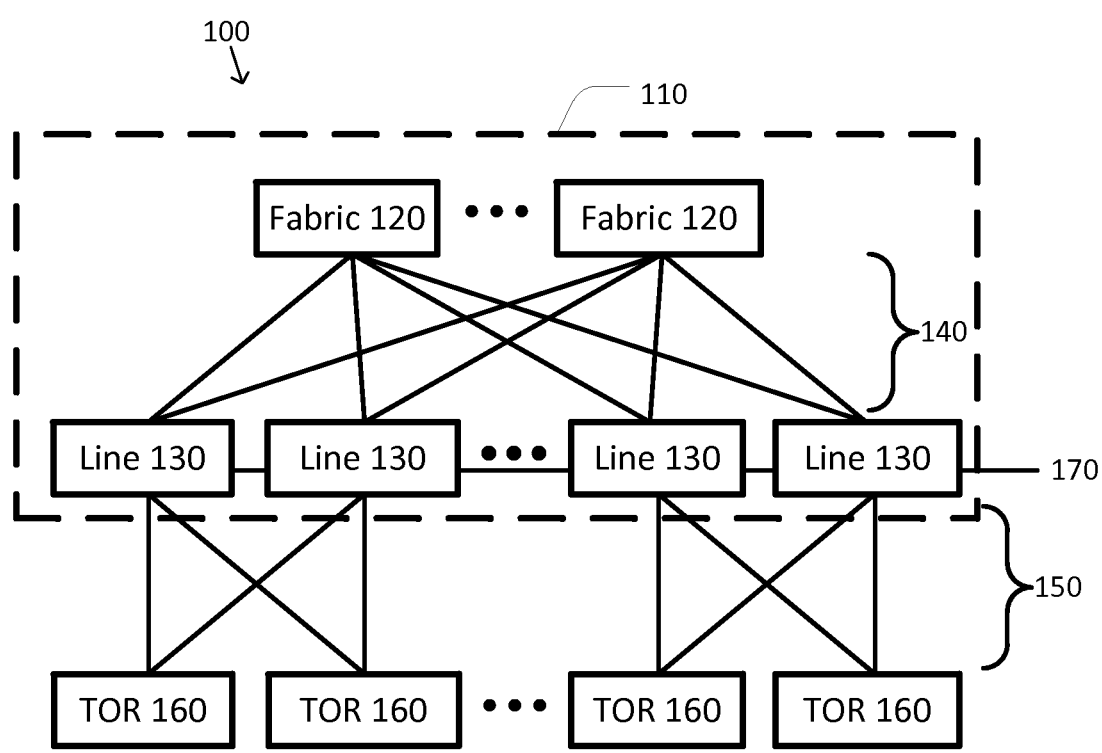
FIG. 1 shows a simplified diagram of a network according to some embodiments.

FIG. 1 shows a simplified diagram of a network 100 according to some embodiments. As shown in FIG. 1, network 100 is configured around a multi-tier switching fabric that may be suitable for use with many data centers. Network 100 is configured around a two-tier switching fabric 110. Switching fabric 110 includes a plurality of switches to implement the interconnections between other switches and/or network devices in network 100. More specifically, the plurality of switches in switching fabric 110 is separated into switches that perform one of two roles. A first one or more of the switches are fabric switches 120 and a second one or more of the switches are line card switches 130. The fabric switches 120 are used to interconnect the line card switches 130 using a collection of interlinks 140 so that network traffic received at any one of the line card switches 130 may be forwarded to any other of the line card switches 130 by traveling through only one of the fabric switches 120. As a consequence, network traffic may move between any two line card switches 130 using at most two hops and can cross switching fabric 110 using only those two hops. Although only a single interlink 140 is depicted between each of the fabric switches 120 and each of the line card switches 130, one of ordinary skill in the art would understand that there may be multiple interlinks 140 between any pair of fabric switches 120 and line card switches 130. In some examples, switching fabric 110 may function as a single switching entity within the network 100. In some examples, switching fabric 110 may be implemented in a chassis. In some examples, the fabric switches 120 may be implemented using route processing modules (RPMs). In some examples, the line card switches may be implemented using line cards. In some examples, the line cards may be inserted or removed from the chassis.

In some examples, the network 100 may use switching fabric 110 to interconnect other switches and/or network devices that are related to a data center. In some examples, the line card switches 130 may each be coupled to one or more downlinks 150 that couple the line card switches 130 to one or more switches and/or network devices in the network 100 as depicted by the top-of-rack (TOR) devices 160. Although only TOR devices 160 are shown, it would be understand that the line card switches 130 may connect to any type of network device that is part of the network 100 or the corresponding data center such as a server. As further shown in FIG. 1, the downlinks 150 may couple each of the TOR devices 160 with multiple line card switches 130 to provide additional parallelism and redundancy in the network 100. Although only a single downlink 150 is depicted between any pair of TOR devices 160 and line card switches 130, one of ordinary skill in the art would understand that there may be multiple downlinks 150 between any one of the TOR devices 160 and any one of the line card switches 130. In some examples, each of the line card switches 130 may further include one or more uplinks 170 that couple the network 100 to network devices in other networks. In some examples, the uplinks 170 may couple the data center and the TOR devices 160 to the other networks. Although only one uplink 170 is depicted, one of ordinary skill in the art would understand that the uplinks 170 may couple the line card switches 130 to multiple networks and may include more than one uplink connection.

The architecture of switching fabric 110 is designed to support symmetric and robust communication between and among the TOR devices 160 and between the TOR devices 160 and the other networks. The symmetry of switching fabric 110 is implemented by providing interlinks 140 between each of the fabric switches 120 and each of the line card switches 130. In some examples, the symmetry may also support load balancing across the network 100 and switching fabric 110 when any path through switching fabric 110 supports the same bandwidth as any other path. In some examples, characteristics of switching fabric 110 may be described using several metrics. In some examples, the metrics may include an oversubscription ratio and downlink and uplink capabilities.

The oversubscription ratio is a measure of a ratio between a bandwidth allocated to the downlinks 150 and the uplinks 170 and a bandwidth allocated to the interlinks 140. In some examples, the oversubscription ratio determines how much network traffic the interlinks 140 can handle relative to the downlinks 150 and the uplinks 170. In some examples, a higher oversubscription ratio indicates that switching fabric 110 may be better able to handle more network traffic that travels through only a single line card switch 130 than network traffic that also travels through a fabric switch 120. In some examples, when the oversubscription ratio is 1:1, the bandwidth allocated to the downlinks 150 and the uplinks 170 is the same as the bandwidth allocated to the interlinks 140. In some examples, when the oversubscription ratio is 2:1, the bandwidth allocated to the downlinks 150 and the uplinks 170 is twice the bandwidth allocated to the interlinks 140. In some examples, the oversubscription ratio may be 1:1, 2:1, 3:1, or 5:1.

The downlink and uplink capabilities are a measure of how much network traffic switching fabric 110 may be able to handle. In some examples, the downlink and uplink capabilities may be associated with a bandwidth of downlink and uplink network traffic that flows through switching fabric 110. In some examples, the downlink and uplink capabilities may be associated with a number of downlink and uplink ports used by switching fabric 110 to support a desired number of downlink 150 and uplink 170 connections to the TOR devices 160, servers, network devices, and/or other networks.

Despite the many advantages, switching fabric 110 may not adapt or scale well to changing requirements of network 100. In some examples, once the cabling that forms the interlinks 140, the downlinks 150, and the uplinks 170 are installed, switching fabric 110 of switching fabric 110 may not be altered without physically rearranging the cabling. In some examples, when switching fabric 110 is implemented using a chassis, the interconnections that form the interlinks 140 using connectors, midplanes, and/or backplanes impose a rigid or fairly rigid architecture on switching fabric 110. In some examples, this means that once switching fabric 110 is physically assembled, the oversubscription ratio and the downlink and uplink capabilities for switching fabric 110 may have little or no flexibility. In some examples, an ability to interchange line cards including the line card switches 130 may introduce additional flexibility in switching fabric 110, but this additional flexibility may be limited because many chassis do not support more than a few different line card types. In some examples, interchanging the line cards may also require that physical changes be made to the cabling and/or other interconnections used to implement the interlinks 140, the downlinks 150, and/or the uplinks 170. In some examples, switching fabric 110 may also incur significant development costs because integration of different types of fabric switches 120 and line card switches 130 may often require custom integration between hardware and software implementing switching fabric 110. In some examples, switching fabric 110 may only have a limited ability to adapt to significant changes in the network traffic switching fabric 110 is handling. In some examples, when some of the line card switches 130 receive significantly more network traffic than others of the line card switches 130, switching fabric 110 may have only a limited ability to address the imbalance due to the largely fixed architecture. In some examples, these limitations may limit a useful lifetime for switching fabric 110. In some examples, the limited useful lifetime may result in higher costs.

Figure 2A:
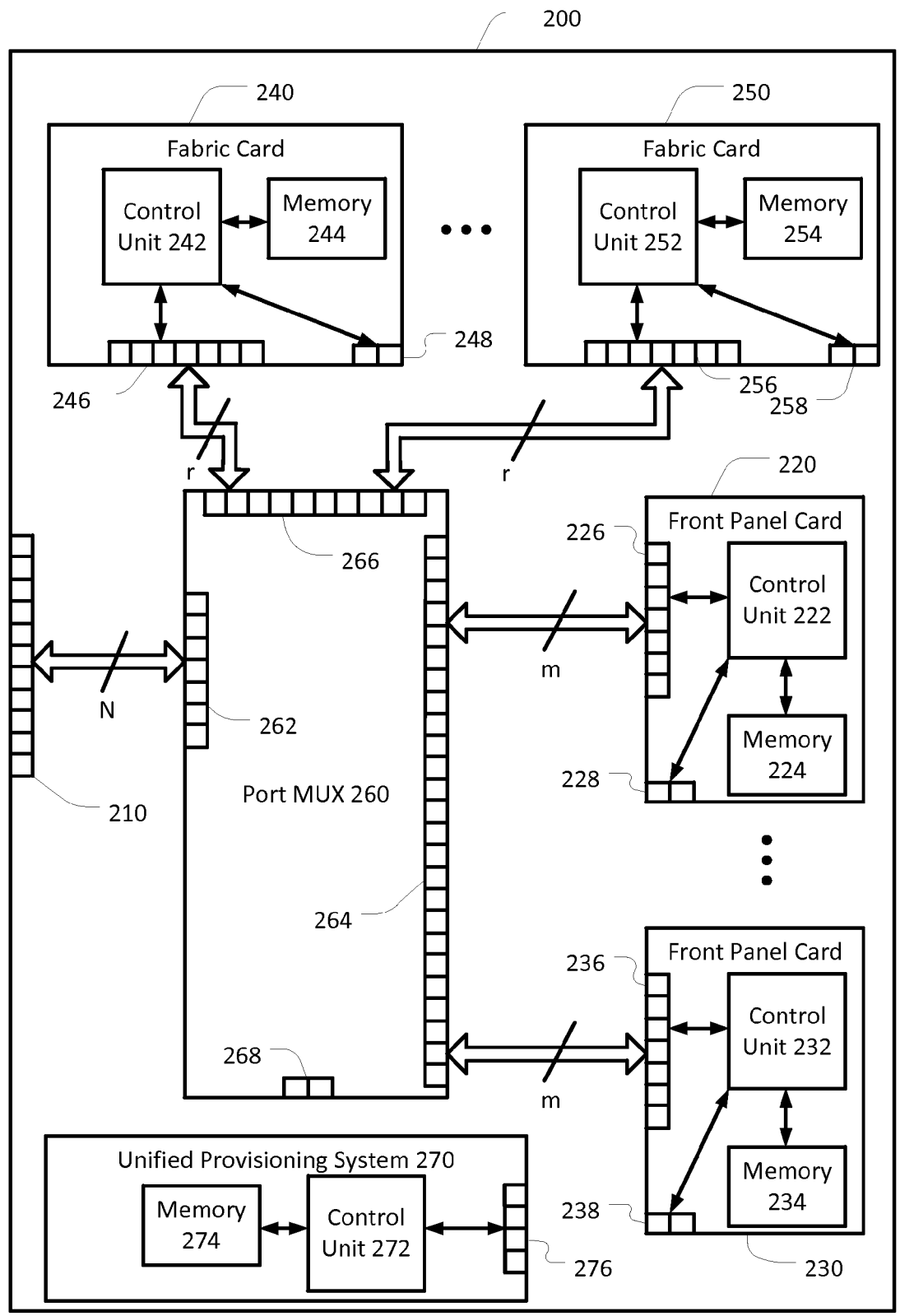
FIG. 2A shows a simplified diagram of a flexible switching fabric according to some embodiments.

FIG. 2A shows a simplified diagram of a flexible switching fabric 200 according to some embodiments. As shown in FIG. 2A, switching fabric 200 includes one or more external connectors 210. In some examples, the one or more external connectors 210 may provide connection points for one or more downlinks between switching fabric 200 and other network devices. In some examples, the one or more external connectors 210 may provide connection points for one or more uplinks between switching fabric 200 and other network devices and/or networks. In some examples, each of the one or more external connectors 210 is configured to receive a network connector. In some examples, switching fabric 200 may be enclosed in a single chassis. In some examples, switching fabric 200 may be a chassis. In some examples, switching fabric 200 may include one or more interchangeable modules.

Switching fabric 200 further includes a plurality of front panel cards including a front panel card 220 and a front panel card 230. And although only two front panel cards are depicted in switching fabric 200, one of ordinary skill in the art would understand that switching fabric 200 may include any number of front panel cards. In some examples, one or more of the front panel cards, including front panel cards 220 and 230 may be a network switching device or a switch. In some examples, one or more of the front panel cards may be an insertable and/or modular card. In some examples, one or more of the front panel cards may be a line card.

Front panel card 220 includes a control unit 222 and memory 224. Control unit 222 is coupled to memory 224 and may control the operation of front panel card 220. In some examples, control unit 222 may be used to make forwarding decisions for network traffic being handled by front panel card 220. In some examples, control unit 222 may include one or more processors. In some examples, control unit 222 may include one or more ASICs. Front panel card 220 further includes one or more network ports 226 for coupling front panel card 220 to other switches, network devices, and/or cards using network links. Front panel card 220 further includes one or more management ports 228 for coupling front panel card 220 to a management network. In some examples, the one or more network ports 226 and the one or more management ports 228 may be included in a common group of ports that may be used for network and/or management traffic. In some examples, control unit 222 may use one or more protocols to communicate with the other switches, network devices, cards, and/or the management network using the one or more network ports 226 and/or the one or more management ports 228.

Front panel card 230 includes a control unit 232 and memory 234. Control unit 232 is coupled to memory 234 and may control the operation of front panel card 230. In some examples, control unit 232 may be used to make forwarding decisions for network traffic being handled by front panel card 230. In some examples, control unit 232 may include one or more processors. In some examples, control unit 232 may include one or more ASICs. Front panel card 230 further includes one or more network ports 236 for coupling front panel card 230 to other switches, network devices, and/or cards using network links. Front panel card 230 further includes one or more management ports 238 for coupling front panel card 230 to a management network. In some examples, the one or more network ports 236 and the one or more management ports 238 may be included in a common group of ports that may be used for network and/or management traffic. In some examples, control unit 232 may use one or more protocols to communicate with the other switches, network devices, cards, and/or the management network using the one or more network ports 236 and/or the one or more management ports 238.

Switching fabric 200 further includes a plurality of fabric cards including a fabric card 240 and a fabric card 250. And although only two fabric cards are depicted in switching fabric 200, one of ordinary skill in the art would understand that switching fabric 200 may include any number of fabric cards. In some examples, one or more of the fabric cards, including fabric cards 240 and 250 may be a network switching device or a switch. In some examples, each of the fabric cards may be an insertable and/or modular card. In some examples, one or more of the fabric cards may be a RPM.

Fabric card 240 includes a control unit 242 and memory 244. Control unit 242 is coupled to memory 244 and may control the operation of fabric card 240. In some examples, control unit 242 may be used to make forwarding decisions for network traffic being handled by fabric card 240. In some examples, control unit 242 may include one or more processors. In some examples, control unit 242 may include one or more ASICs. Fabric card 240 further includes one or more network ports 246 for coupling fabric card 240 to other switches, network devices, and/or cards using network links. Fabric card 240 further includes one or more management ports 248 for coupling fabric card 240 to a management network. In some examples, the one or more network ports 246 and the one or more management ports 248 may be included in a common group of ports that may be used for network and/or management traffic. In some examples, control unit 242 may use one or more protocols to communicate with the other switches, network devices, cards, and/or the management network using the one or more network ports 246 and/or the one or more management ports 248.

Fabric card 250 includes a control unit 252 and memory 254. Control unit 252 is coupled to memory 254 and may control the operation of fabric card 250. In some examples, control unit 252 may be used to make forwarding decisions for network traffic being handled by fabric card 250. In some examples, control unit 252 may include one or more processors. In some examples, control unit 252 may include one or more ASICs. Fabric card 250 further includes one or more network ports 256 for coupling fabric card 250 to other switches, network devices, and/or cards using network links. Fabric card 250 further includes one or more management ports 258 for coupling fabric card 250 to a management network. In some examples, the one or more network ports 256 and the one or more management ports 258 may be included in a common group of ports that may be used for network and/or management traffic. In some examples, control unit 252 may use one or more protocols to communicate with the other switches, network devices, cards, and/or the management network using the one or more network ports 256 and/or the one or more management ports 258.

Switching fabric 200 further includes a port multiplexor 260. Port multiplexor 260 includes one or more external connector connection points 262, one or more front panel card connection points 254, and one or more fabric card connection points 266. In some examples, port multiplexor 260 may be used to flexibly couple any one of the external connector connection points 262 to any one of the front panel card connection points 264. In some examples, port multiplexor 260 may be used to flexibly couple any one of the fabric card connection points 266 to any one of the front panel card connection points 264. Thus, port multiplexor 260 may be used to couple any front panel card connection point 264 to either one of the external connector connection points 262 or one of the fabric card connection points 266. In some examples, port multiplexor 260 may include a matrix of switches interconnecting the external connector connection points 262, front panel card connection points 264, and the fabric card connection points 266 and may not be a network switching device making routing and/or forwarding decisions.

External connector connection points 262 may be used to couple the port multiplexor 260 to external connectors 210. In some examples, each external connector connection point 262 is coupled to a corresponding external connector 210. In some examples, a number of the external connectors 210 may be N.

Front panel card connection points 264 may be used to couple the port multiplexor 260 to front panel cards 220 and 230. In some examples, each front panel card connection point 264 is coupled to a corresponding network port 226 or 236 on a corresponding front panel card 220 or 230, respectively. In some examples, a number of the front panel card connection points 264 may be equal to a number of front panel cards 220, 230 multiplied by a number of network ports 226, 236 per front panel card 220, 230. In some examples, when switching fabric 200 includes fp front panel cards 220, 230 and each front panel card 220, 230 includes m network ports 226, 236, the number of front panel connection points 264 is M=fp*m. As shown in FIG. 2A, each front panel card includes m network ports, however, one of ordinary skill in the art would understand that each front panel card 220, 230 may include different numbers of network ports 226, 236.

Fabric card connection points 266 may be used to couple the port multiplexor 260 to fabric cards 240 and 250. In some examples, each fabric card connection point 266 is coupled to a corresponding network port 246 or 256 on a corresponding fabric card 240 or 250, respectively. In some examples, a number of the fabric card connection points 266 may be equal to a number of fabric cards 240, 250 multiplied by a number of network ports 246, 256 per fabric card 240, 250. In some examples, when switching fabric 200 includes fc fabric cards 240, 250 and each fabric card 240, 250 includes r network ports 246, 256, the number of fabric connection points 266 is R=fc*r. As shown in FIG. 2A, each fabric card includes r network ports, however, one of ordinary skill in the art would understand that each fabric card 240, 250 may include different numbers of network ports 246, 256.

Port multiplexor 260 further includes one or more management connection points 268. Management connection points 268 may be used to couple port multiplexor 260 to one or more controllers and/or provisioning systems. In some examples, provisioning information provided to port multiplexor 260 using management connection points 268 may be used to map each of the front panel card connection points 264 to either an external connector connection point 262 or a fabric card connection point 266. In some examples, the provisioning information may be selected based on a desired oversubscription ratio and/or downlink and uplink capabilities for switching fabric 200.

In some embodiments, coupling between external connectors 210 and external connector connection points 262, between network ports 226, 236 and front panel card connection points 264, and between network ports 246, 256 and fabric card connection points 266 may be implemented in numerous ways. In some examples, the coupling may include one or more direct connectors. In some examples, the coupling may include one or more buses. In some examples, the coupling may include one or more backplanes and/or midplanes of a chassis. In some examples, the coupling may include one or more cables.

Switching fabric 200 further includes a unified provisioning system 270. Unified provisioning system 270 includes a control unit 272 and memory 274. Control unit 272 is coupled to memory 274 and may control the operation of unified provisioning system 270. In some examples, control unit 272 may be used to direct the provisioning of switching fabric 200. In some examples, control unit 272 may include one or more processors. In some examples, control unit 272 may include one or more ASICs. In some examples, unified provisioning system 270 may be implemented in a virtual machine. Unified provisioning system 270 further includes one or more ports 276 for coupling unified provisioning system 270 to front panel cards 220, 230, fabric cards 240, 250, and/or port multiplexor 260 using management ports 228, 238, 248, 258 and/or management connection points 268, respectively. In some examples, unified provisioning system 270 may provide messages and/or control signals to port multiplexor 260 to configure the coupling between the external connector connection points 262 and the front panel card connection points 264. In some examples, unified provisioning system 270 may provide messages and/or control signals to port multiplexor 260 to configure the coupling between the fabric card connection points 266 and the front panel card connection points 264. In some examples, unified provisioning system 270 may transmit one or more flow control messages to front panel cards 220, 230 and/or fabric cards 240, 250 to control a forwarding, switching, and/or routing behavior of front panel cards 220, 230 and/or fabric cards 240, 250. In some examples, each of the front panel cards 220, 230 and/or each of the fabric cards 240, 250 may operate autonomously and/or independently of each other. In some examples, because each of the front panel cards 220, 230 and/or each of the fabric cards 240, 250 may operate autonomously, switching fabric 200 may not require a centralized control unit to coordinate forwarding of network traffic through switching fabric 200.

In some embodiments, unified provisioning system 270 may provide a common interface point for provisioning switching fabric 200. In some examples, unified provisioning system 270 may use one or more discovery protocols to identify and/or determine a type of each of the front panel cards 220, 230, each of the fabric cards 240, 250, and/or port multiplexor 260. In some examples, the one or more protocols include the Link Layer Discovery Protocol (LLDP). In some examples, unified provisioning system 270 may support use of autonomous devices for each of the front panel cards 220, 230, each of the fabric cards 240, 250, and/or port multiplexor 260. In some examples, each of the front panel cards 220, 230 may be of different types, use different operating systems, and/or use different versions of the same operating system. In some examples, each of the fabric cards 240, 250 may be of different types, use different operating systems, and/or use different versions of the same operating system.

The memories 224, 234, 244, 254, and/or 274 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In some embodiments, switching fabric 200 may be used to forward network traffic between network devices coupled to the one or more external connectors 210. Representative operation of switching fabric 200 may be illustrated through several examples.

Figure 2B:
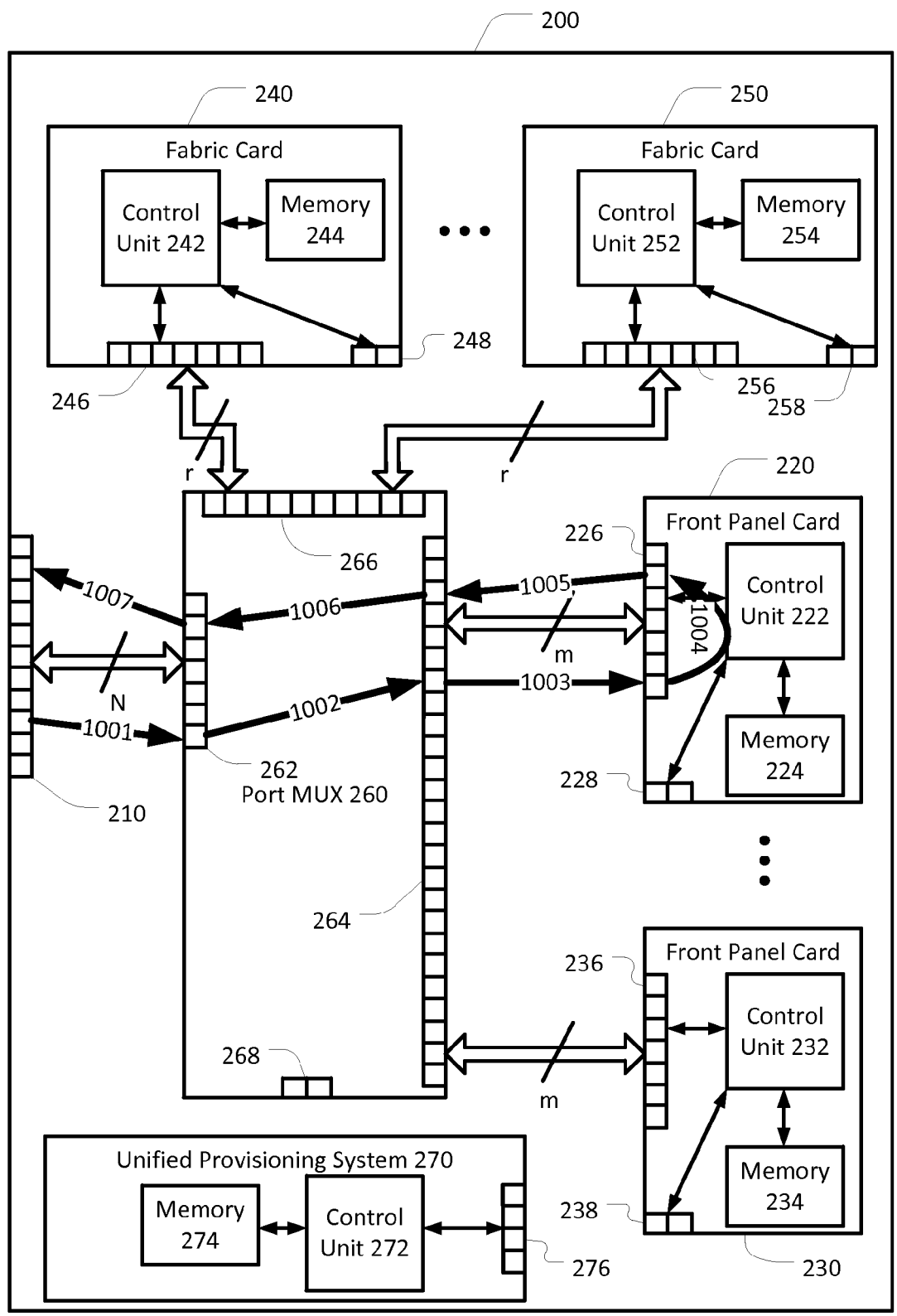
FIG. 2B is a simplified diagram of network packet forwarding in the switching fabric of FIG. 2A according to some embodiments.

FIG. 2B is a simplified diagram of network packet forwarding in the switching fabric 200 of FIG. 2A according to some embodiments. A first network packet may be received at a first one of the one or more external connectors 210 which is coupled to a first external connector connection point 262 on port multiplexor 260 (arrow 1001). Port multiplexor 260 uses its internal switching matrix to couple the first external connector connection point 262 to a first front panel card connection point 264 (arrow 1002), which is in turn coupled to a first network port 226 on front panel card 220 (arrow 1003). Consequently, the first network packet is received at front panel card 220. Front panel card 220 forwards the first network packet by transmitting it on a second network port 226 (arrow 1004). Second network port 226 is coupled to a second front panel card connection point 264 (arrow 1005) that port multiplexor 260 has coupled to a second external connector connection point 262 using the internal switching matrix (arrow 1006). Because the second external connector connection point 262 is coupled to a second external connector 210 (arrow 1007), the network packet is transmitted out of switching fabric 200. Thus, the first network packet is received by switching fabric 200 at the first external connector 210 where it is coupled through port multiplexor 260 to front panel card 220 at the first network port 226 (arrows 1001-1003). Front panel card 220 forwards the first network packet to the second network port 226 (arrow 1004) where it is coupled back through port multiplexor 260 to the second external connector 210 (arrows 1005-1007) where the first network packet is transmitted towards its destination by switching fabric 200.

Figure 2C:
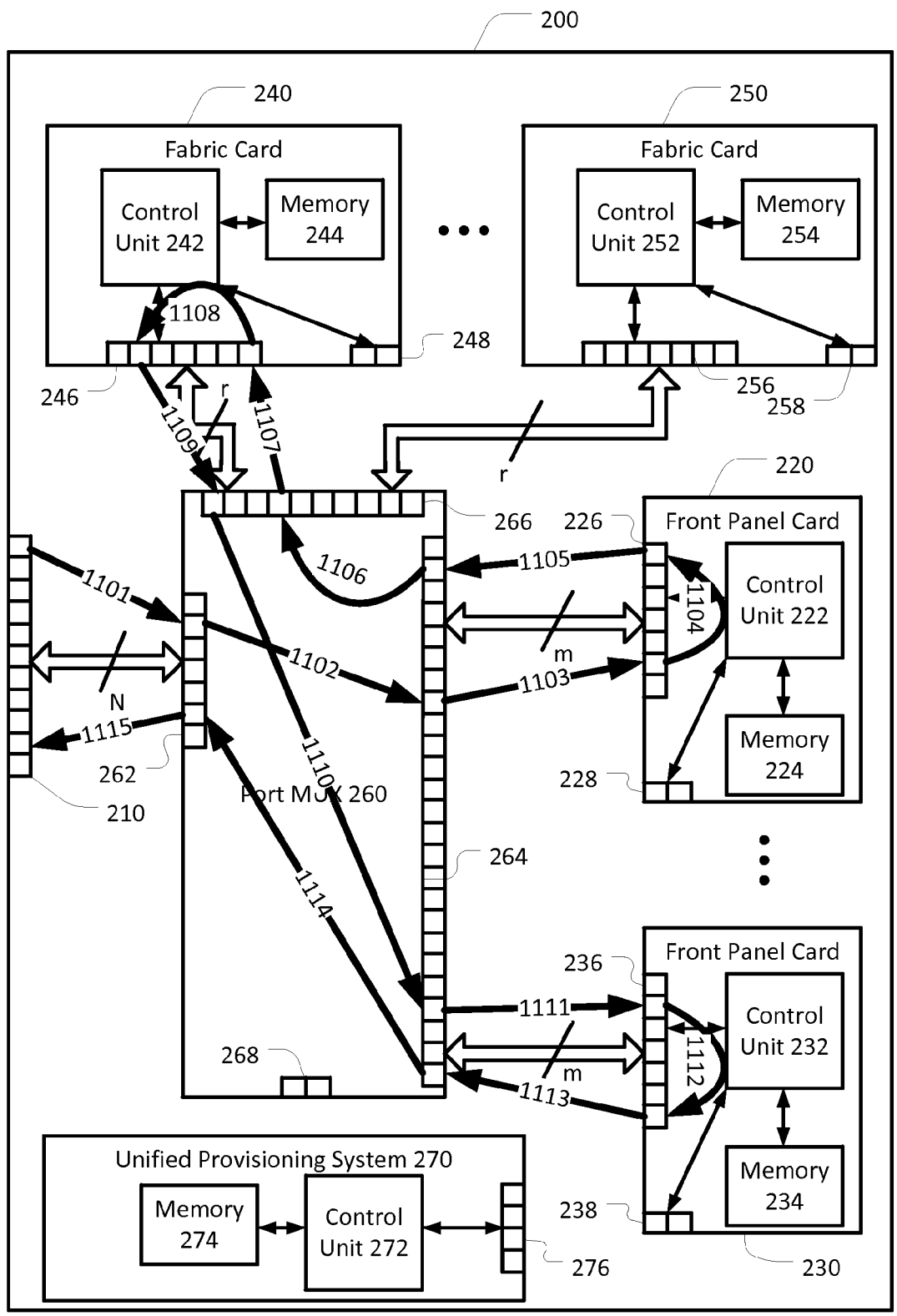
FIG. 2C is a simplified diagram of network packet forwarding in the switching fabric of FIG. 2A according to some embodiments.

FIG. 2C is a simplified diagram of network packet forwarding in the switching fabric 200 of FIG. 2A according to some embodiments. A second network packet may be received at a third one of the one or more external connectors 210 which is coupled to a third external connector connection point 262 on port multiplexor 260 (arrow 1101). Port multiplexor 260 uses its internal switching matrix to couple the third external connector connection point 262 to a third front panel card connection point 264 (arrow 1102), which is in turn coupled to a third network port 226 on front panel card 220 (arrow 1103). Consequently, the second network packet is received at front panel card 220. Front panel card 220 forwards the second network packet by transmitting it on a fourth network port 226 (arrow 1104). Fourth network port 226 is coupled to a fourth front panel card connection point 264 (arrow 1105) that port multiplexor 260 has coupled to a first fabric card connection point 266 using the internal switching matrix (arrow 1106), which is coupled to a fifth network port 256 on fabric card 240 (arrow 1107). Consequently, the second network packet is received at fabric card 240. Fabric card 240 forwards the second network packet by transmitting it on a sixth network port 256 (arrow 1108). Sixth network port 256 is coupled to a third fabric card connection point 266 (arrow 1109) that port multiplexor 260 has coupled to a fifth front panel card connection point 264 using the internal switching matrix (arrow 1110), which is coupled to a seventh network port 236 on front panel card 230 (arrow 1111). Consequently, the second network packet is received at front panel card 230. Front panel card 230 forwards the second network packet by transmitting it on an eighth network port 236 (arrow 1112). Eighth network port 236 is coupled to a sixth front panel card connection point 264 (arrow 1113) that port multiplexor 260 has coupled to a fourth external connector connection point 262 using the internal switching matrix (arrow 1104). Because the fourth external connector connection point 262 is coupled to a fourth external connector 210 (arrow 1115), the network packet is transmitted out of switching fabric 200. Thus, the second network packet is received by switching fabric 200 at the third external connector 210 where it is coupled through port multiplexor 260 to front panel card 220 at the third network port 226 (arrows 1101-1103). Front panel card 220 forwards the second network packet to the fourth network port 226 (arrow 1104) where it is directed back through port multiplexor 260 to fabric card 240 at the fifth network port 256 (arrows 1105-1107). Fabric card 240 forwards the second network packet to the sixth network port 256 (arrow 1108) where it is coupled back through port multiplexor 260 to front panel card 230 at the seventh network port 236 (arrows 1109-1111). Front panel card 230 forwards the second network packet to the eighth network port 236 (arrow 1112) where it is coupled back through port multiplexor 260 to the fourth external connector 210 (arrows 1113-1115) where the second network packet is transmitted towards its destination by switching fabric 200.

In some embodiments, even though inclusion of port multiplexor 260 to switching fabric 200 may increase a complexity and/or a cost of switching fabric 200, several useful advantages may also be achieved. In some examples, the flexible coupling of port multiplexor 260 may permit adjustments in the oversubscription ratio of switching fabric 200. In some examples, when the number of front panel connection points M is equal to the number of external connector connection points N added to the number of fabric port connection points R (M=N+R), the oversubscription ratio may be relatively fixed at a ratio of N:R. In some examples, when M is less than N+R greater flexibility in the oversubscription ratio may be obtained by selecting shifting front panel connection points 264 from being coupled to external connector connection points 262 to fabric card connection points 266, or vice-versa. In some examples, when M is less than N+R, utilization of complete functionality of all the fabric cards 240, 250 may not be achieved. In some examples, when M is less than N+R, adjustments to the downlink and uplink capabilities may be made by controlling how many of the external connector connection points 262 are coupled to front panel card connection points 264.

In some examples, the flexible coupling of port multiplexor 260 may support dynamic reconfiguration of switching fabric 200. In some examples, port multiplexor may permit the equivalent of dynamic rearrangement of the cabling between front panel cards 220, 230 and external connectors 210 and/or fabric cards 220, 230. In some examples, when network traffic patterns result in greater utilization of one or more of the front panel cards 220, 230 and/or one or more of the fabric cards 240, 250, the coupling of port multiplexor 260 may be adjusted to shift network traffic to different front panel cards 220, 230 and/or fabric cards 240, 250. In some examples, dynamic reconfiguration of switching fabric 200 may reduce disruptions due to rebooting and/or replacement of front panel cards 220, 230 and/or fabric cards 240, 250. Port multiplexor 260 may be used to temporarily couple network traffic away from a rebooting and/or a replaced front panel card 220, 230 and/or fabric card 240, 250 before restoring the coupling later.

In some examples, the flexible coupling of port multiplexor 260 may extend the useful lifetime of switching fabric 200. In some examples, the extended useful lifetime of switching fabric 200 may more than offset the increased cost due to the inclusion of port multiplexor 260.

As discussed above and further emphasized here, FIGS. 2A-2C are merely examples which should not unduly limit the scope of the claims. One of ordinary skill in the art would recognize many variations, alternatives, and modifications. In some embodiments, unified provisioning system 270 may be distributed among multiple devices. In some embodiments, unified provisioning system 270 may be included in one or more of the fabric cards 240, 250. In some embodiments, unified provisioning system 270 may be separate from switching fabric 200. In some embodiments, unified provisioning system 270 may be shared among a plurality of switching fabrics.

Figure 3:
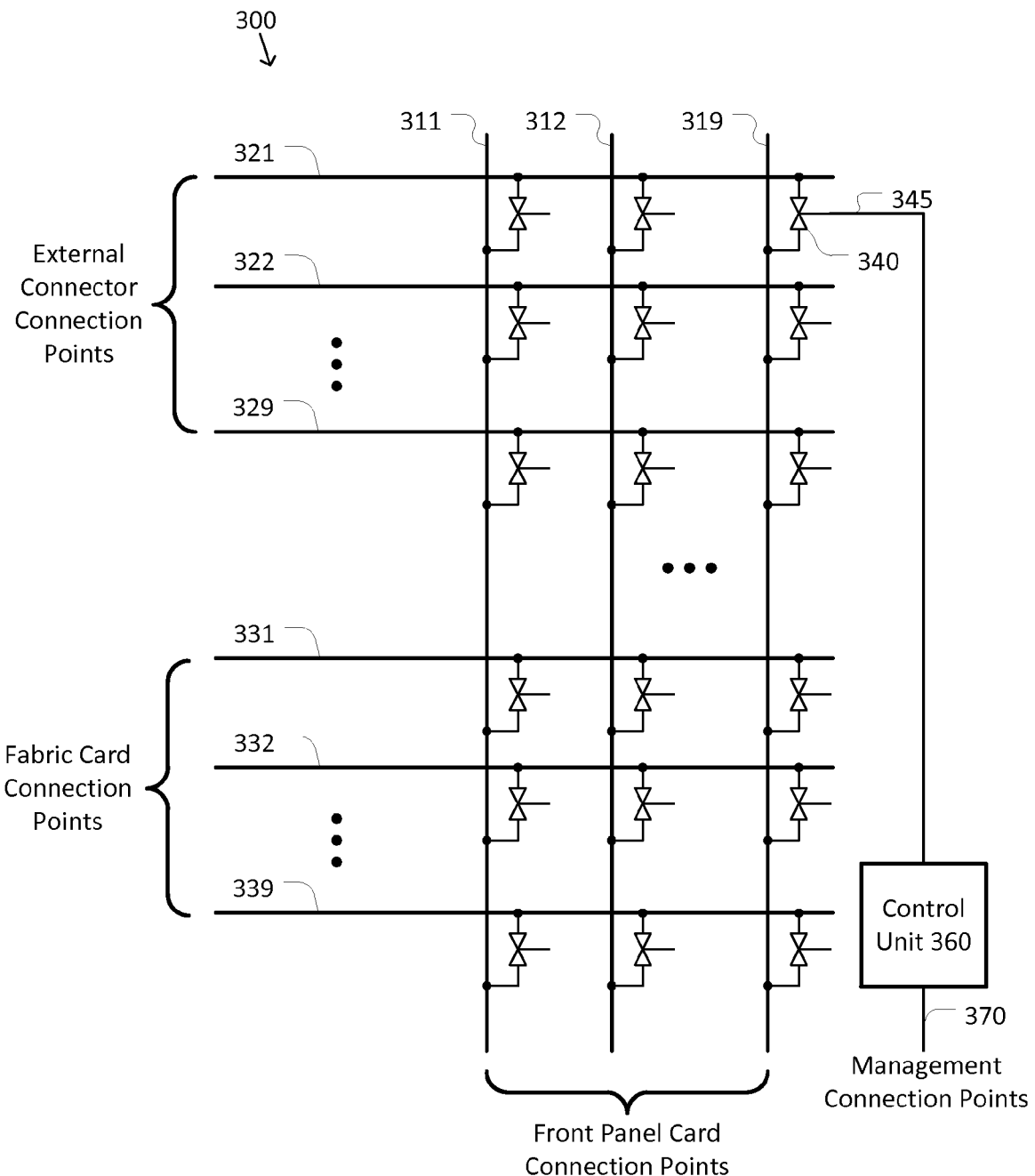
FIG. 3 shows a simplified diagram of a crossbar switch according to some embodiments.

FIG. 3 shows a simplified diagram of a crossbar switch 300 according to some embodiments. As shown in FIG. 3, crossbar switch 300 may be used to couple external connector connection points and/or fabric card connection points with front panel card connection points. In some examples, crossbar switch 300 may be port multiplexor 260. Crossbar switch 300 includes a plurality of front panel card connection lines 311, 312, ..., 319. Each of the front panel card connection lines 311-319 is coupled to a corresponding front panel card connection point. Crossbar switch 300 further includes a plurality of external connector connection lines 321, 322, ..., 329. Each of the external connector connection lines 321-329 is coupled to a corresponding external connector connection point. Crossbar switch 300 further includes a plurality of fabric card connection lines 331, 332, ..., 339. Each of the fabric card connection lines 331-339 is coupled to a corresponding fabric card connection point.

Crossbar switch 300 further includes a plurality of coupling elements. Each of the coupling elements is connected between a corresponding front panel card connection line 311-319 and a corresponding external connector connection line 321-329 or a corresponding front panel card connection line 311-319 and a corresponding fabric card connection line 331-339. By activating a control line on each of the coupling elements, the respective coupling element couples the corresponding connection lines. For example, coupling element 340 may be used to couple front panel card connection line 319 to external connector connection line 321. When control line 345 is active, coupling element 340 couples front panel card connection line 319 to external connector connection line 321. When control line 345 is inactive, coupling element 340 disconnects front panel card connection line 319 from external connector connection line 321.

By selectively activating and deactivating each of the plurality of coupling elements, crossbar switch 300 provides flexible coupling between a corresponding front panel card connection line 311-319 and a corresponding external connector connection line 321-329 or a corresponding front panel card connection line 311-319 and a corresponding fabric card connection line 331-339. In some examples, the coupling elements (e.g., coupling element 340) may be any device that supports bidirectional coupling through the respective coupling element. Each of the control lines (e.g., control line 345) are coupled a control unit 360 and/or a logic circuit for selectively activating or deactivating the respective control lines to achieve desired interconnections across crossbar switch 300. Control unit 360 may further be coupled to management connection points. And although each of the front panel card connection lines 311-319, external connector connection lines 321-329, and fabric card connection lines 331-339 are depicted as single lines, one of ordinary skill in the art would understand that each connection line 311-339 may include multiple lines as is common in network links between switching ports. Correspondingly, each of the coupling elements (e.g., coupling element 340) include the capability to couple or disconnect each of the multiple lines.

As discussed above and further emphasized here, FIG. 3 is merely an example which should not unduly limit the scope of the claims. One of ordinary skill in the art would recognize many variations, alternatives, and modifications. In some embodiments, crossbar switch 300 may support additional and/or different couplings between the connection lines 311-339. In some embodiments, crossbar switch 300 may include other coupling topologies than the matrix depicted in FIG. 3. In some examples, crossbar switch 300 may include an array and/or matrix of smaller matrices that are interconnected.

Figure 4:
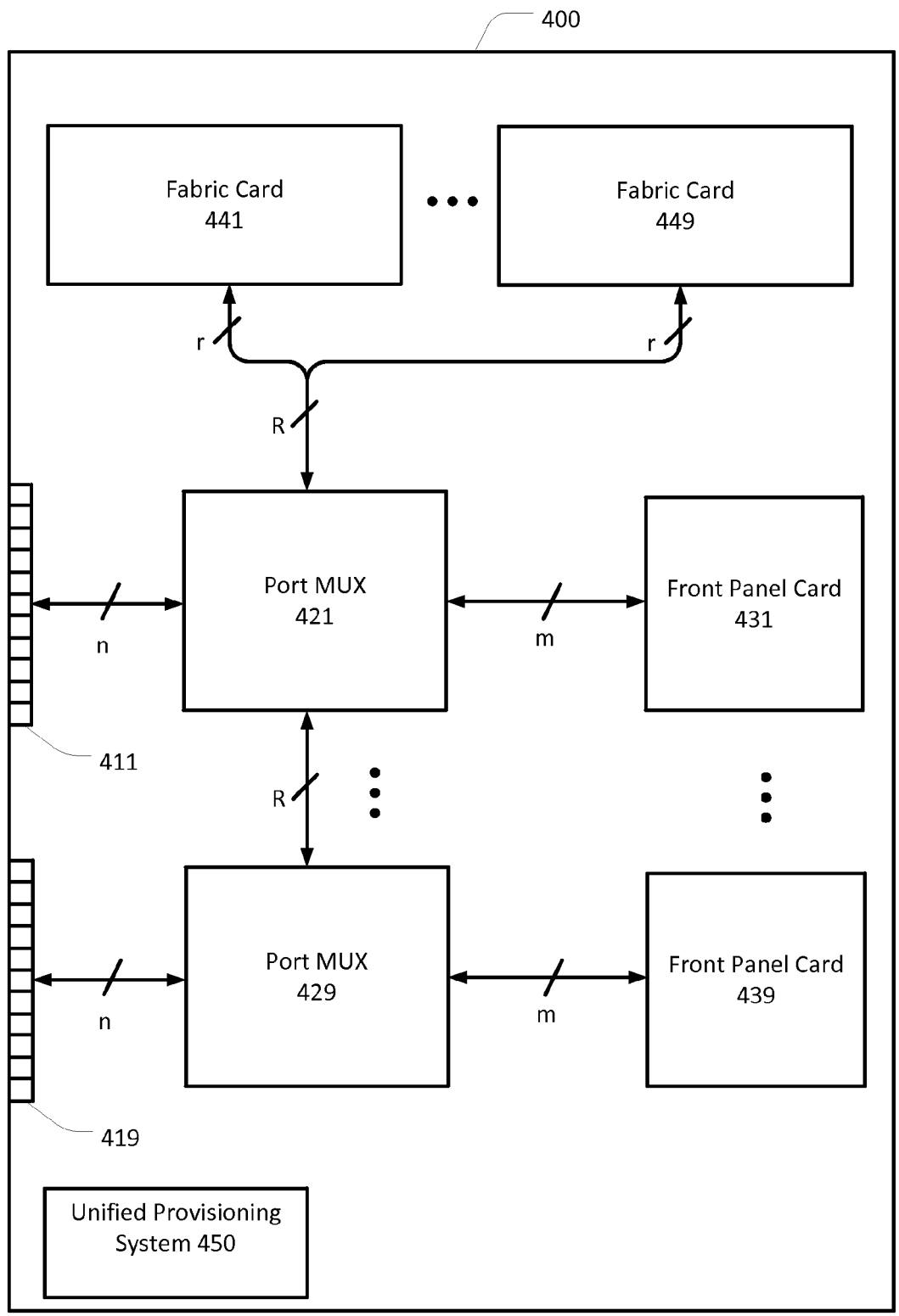
FIG. 4 shows a simplified diagram of a flexible switching fabric according to some embodiments.

FIG. 4 shows a simplified diagram of a flexible switching fabric 400 according to some embodiments. As shown in FIG. 4, switching fabric 400 includes a single port multiplexor for each front panel card. More specifically, switching fabric 400 includes a plurality of groups of external connectors 411-419. Each group of external connectors 411-419 is coupled to a corresponding port multiplexor 421-429. Each of the port multiplexors 411-419 is also coupled to a corresponding front panel card 431-439 (e.g., port multiplexor 421 to front panel card 431 and port multiplexor 429 to front panel card 439) as well as to each of a plurality of fabric cards 441-449. Thus, each of the port multiplexors 421-429 in switching fabric 400 may flexibly couple a corresponding front panel card 431-439 to both a corresponding group of external connectors 411-419 and the fabric cards 441-449. In some examples, the front panel cards 431-439 may be the front panel cards 220, 230. In some examples, the fabric cards 441-449 may be the fabric cards 240, 250. Switching fabric 400 further includes a unified provisioning system 450 that is similar to unified provisioning system 270, but supports provisioning of each of the port multiplexors 421-429.

Figure 5:
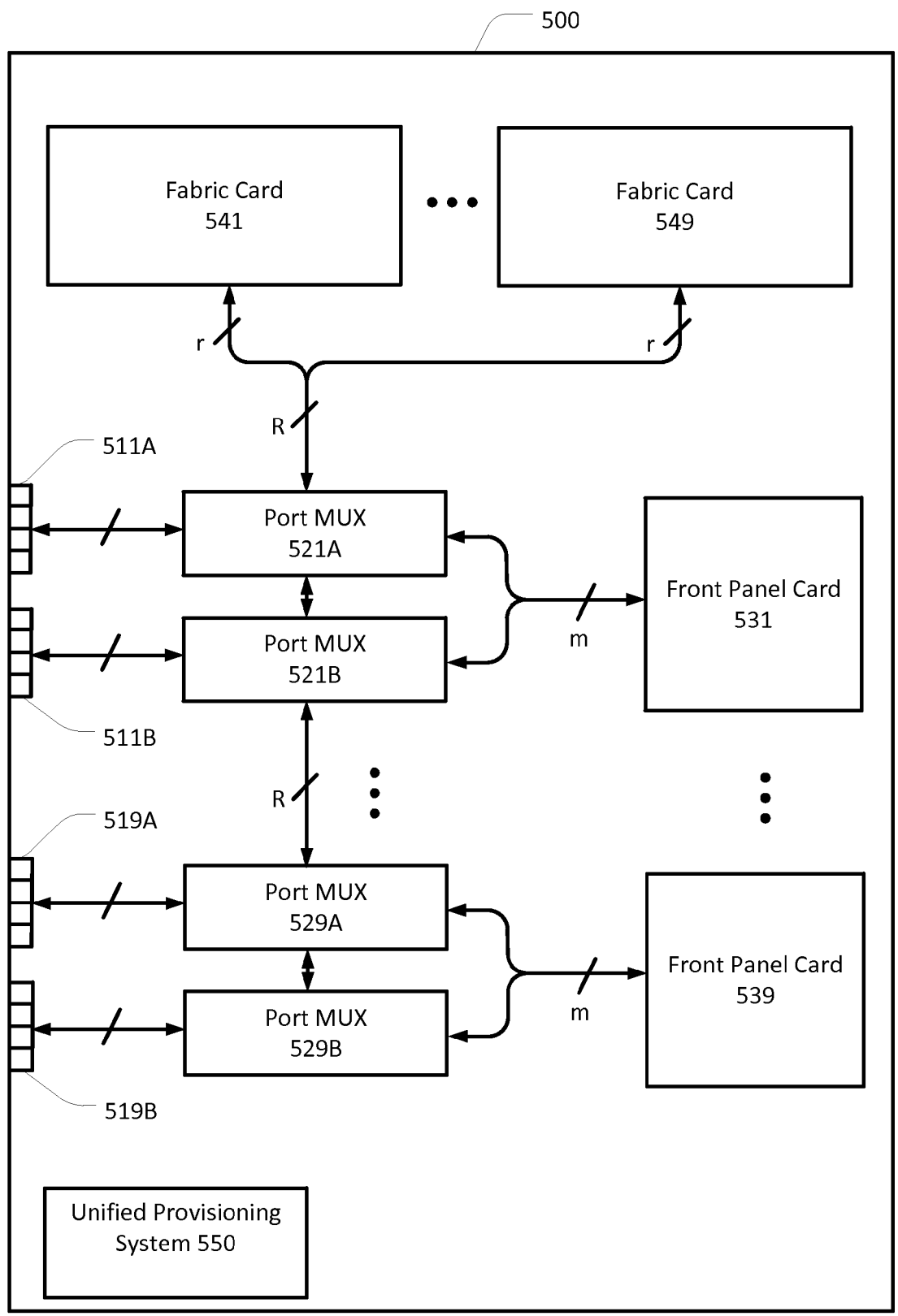
FIG. 5 shows a simplified diagram of a flexible switching fabric according to some embodiments.

FIG. 5 shows a simplified diagram of a flexible switching fabric 500 according to some embodiments. As shown in FIG. 5, switching fabric 500 includes a plurality of port multiplexors for each front panel card. More specifically, switching fabric 500 includes a plurality of groups of external connectors 511A and 511B through 519A and 519B. Each group of external connectors 511A and 511B through 519A-519B is coupled to a corresponding port multiplexor 521A and 521B through 529A and 529B. Each of the port multiplexors 511A and 511B through 519A and 519B is also coupled to a corresponding front panel card 531-539 (e.g., port multiplexor 521A and port multiplexor 521B to front panel card 531) as well as to each of a plurality of fabric cards 541-549. Thus, each of the front panel cards is coupled to a plurality of port multiplexors, which in turn couple each of the front panel cards 531-539 to the fabric cards 541-549 and corresponding groups of external connectors 511A and 511B through 519A and 519B. In some examples, the front panel cards 531-539 may be the front panel cards 220, 230. In some examples, the fabric cards 541-549 may be the fabric cards 240, 250. Switching fabric 500 further includes a unified provisioning system 550 that is similar to unified provisioning system 270, but supports provisioning of each of the port multiplexors 521A and 521B through 529A and 529B.

As discussed above and further emphasized here, FIGS. 2A, 2B, 2C, 4, and 5 are merely examples which should not unduly limit the scope of the claims. One of ordinary skill in the art would recognize many variations, alternatives, and modifications. In some embodiments, any number of combinations of one or more port multiplexors may be used to provide flexible coupling between external connectors, front panel cards, and fabric cards. In some examples, when multiple port multiplexors are used in a switching fabric, each port multiplexor may have a different number of connection points and provide coupling between different numbers of external connectors, front panel card network ports, and/or fabric card network ports.

In some embodiments, overlapping may occur in connections made to the connection points. In some examples, external connectors may be coupled to multiple port multiplexors. In some examples, front panel card network ports may be coupled to multiple port multiplexors. In some examples, fabric card network ports may be coupled to multiple port multiplexors.

In some embodiments, the port multiplexors may be arranged in different patterns. In some examples, each fabric card may be coupled to only a single port multiplexor. In some examples, each fabric card may be coupled multiple port multiplexors that are not shared with other fabric port cards. In some examples, a matrix of smaller port multiplexors may be used to build a larger port multiplexor.

In some embodiments, the port multiplexor may support coupling besides just between external connectors and front panel card network ports and between fabric card network ports and front panel card network ports. In some examples, the port multiplexor may provide flexible coupling between network ports on different fabric cards. In some examples, the port multiplexor may provide flexible coupling between network ports on different front panel cards. In some examples, the port multiplexor may provide flexible coupling between external connectors. In some examples, the port multiplexor may permit a fabric card to function as a front panel card and/or a front panel card to function as a fabric card. In some examples, the port multiplexor may treat each of the front panel cards and the fabric cards as generic switching cards that may be coupled in any configuration so that any network port on any of the switching cards may be coupled to any other network port on any of the switching cards or to any external connector.

In some embodiments, any of the variations, examples, and embodiments, may be combined in any arrangement and/or combination to provide the port multiplexing for a switching fabric. In some examples, the arrangement and/or combination may be generally referred to as a port multiplexing unit.

Figure 6:
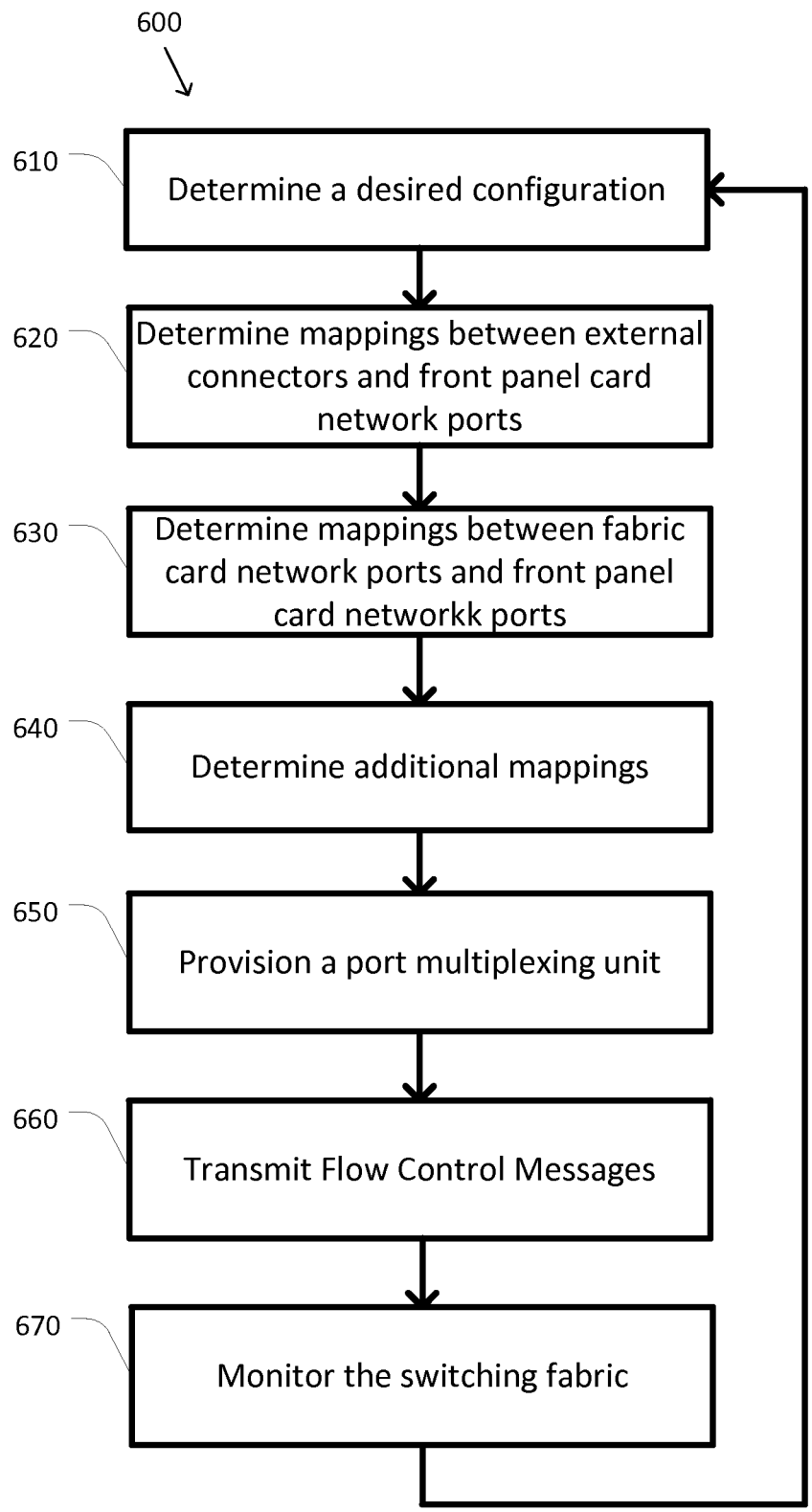
FIG. 6 shows a simplified diagram of a method of provisioning a switching fabric with a port multiplexing unit according to some embodiments.

FIG. 6 shows a simplified diagram of a method 600 of provisioning a switching fabric with a port multiplexing unit according to some embodiments. As shown in FIG. 6, the method 600 includes a process 610 for determining a desired configuration, a process 620 for determining mappings between external connectors and front panel card network ports, a process 630 for determining mappings between fabric card network ports and front panel card network ports, a process 640 for determining additional mappings, a process 650 for provisioning a port multiplexing unit, a process 660 for transmitting flow control messages, and a process for monitoring the switching fabric. According to certain embodiments, the method 600 of provisioning a switching fabric with a port multiplexing unit can be performed using variations among the processes 610-670 as would be recognized by one of ordinary skill in the art. In some embodiments, one or more of the processes 640, 660, and 670 are optional and may be omitted. In some embodiments, one or more of the processes 610-670 of method 600 may be implemented, at least in part, in the form of executable code stored on non-transient, tangible, machine readable media that when run by one or more processors (e.g., the one or more processors 222, 232, 242, 252, and/or 272) may cause the one or more processors to perform one or more of the processes 610-670.

At the process 610, a desired configuration is determined. In some examples, the desired configuration may be for a switching fabric. In some examples, the switching fabric may be switching fabric 200, 400, and/or 500. In some examples, the determination may be made by a provisioning system. In some examples, the determination is transmitted to the provisioning system. In some examples, the provisioning system may be unified provisioning system 270, 450, and/or 550. In some examples, one or more characteristics of the switching fabric are determined. In some examples, the one or more characteristics include and an oversubscription ratio for the switching fabric. In some examples, the one or more characteristics include downlink and uplink capabilities.

At the process 620, mappings between external connectors and front panel card network ports are determined. Based on the configuration determined during process 610, mappings that couple external connectors of the switching fabric to the network ports of one or more front panel cards are determined. In some examples, the mappings may be determined based on the oversubscription ratio. In some examples, the mappings may be determined based on the downlink and uplink capabilities. In some examples, the mappings determine how each of the external connectors may or may not be coupled to respective network ports of the one or more front panel cards. In some examples, the external connectors may be external connectors 210, 411-419, and/or 511A and 511B through 519A and 519B. In some examples, the front panel cards may be the front panel cards 220, 230, 431-439, and/or 531-539. In some examples, the network ports of the front panel cards may be the network ports 226 and/or 236.

At the process 630, mappings between fabric card network ports and front panel card network ports are determined. Based on the configuration determined during process 610, mappings that couple network ports of one or more fabric cards of the switching fabric to the network ports of the one or more front panel cards are determined. In some examples, the mappings may be determined based on the oversubscription ratio. In some examples, the mappings may be determined based on the downlink and uplink capabilities. In some examples, the mappings determine how each of the network ports of the one or more fabric cards may or may not be coupled to respective network ports of the one or more front panel cards. In some examples, the fabric cards may be the fabric cards 240, 250, 441-449, and/or 541-549. In some examples, the network ports of the fabric cards may be the network ports 246 and/or 256.

At the optional process 640, additional mappings may be determined. In some examples, when the switching fabric supports other mappings, these mappings may be determined during process 640. In some examples, the mappings are based on the configuration determined during process 610. In some examples, the additional mappings may determine how one or more of the external connectors are coupled to other corresponding one or more external connectors. In some examples, the additional mappings may determine how one or more of the network ports of the front panel cards are coupled to other corresponding one or more network ports of the front panel cards. In some examples, the additional mappings may determine how one or more of the network ports of the fabric cards are coupled to other corresponding one or more network ports of the fabric cards.

At the process 650, a port multiplexing unit is provisioned. Once the mappings of the switching fabric are determined during processes 620-640, the mappings may be implemented using a port multiplexing unit. In some examples, the provisioning system provides one or more control signals to the port multiplexing unit to create the couplings associated with the mappings. In some examples, the provisioning system transmits one or more messages to the port multiplexing unit to create the couplings associated with the mappings. In some examples, the couplings may be created by activating a control line (e.g., control line 345) on one or more coupling elements (e.g., coupling element 340). In some examples, the port multiplexing unit may include a port multiplexor. In some examples, the port multiplexor may be the port multiplexor 260. In some examples, the port multiplexing unit may include a plurality of port multiplexors. In some examples, the plurality of port multiplexors may include the port multiplexors 421-429 and/or the port multiplexors 521A and 521B through 529A and 529B.

At the optional process 660, flow control messages may be transmitted. In some examples, the provisioning system may transmit one or more flow control messages to configure and/or provision the forwarding, switching, and/or routing behavior of the front panel cards and/or the fabric cards. In some examples, when process 660 is omitted, each of the front panel cards and/or the fabric cards may discover and/or learn the topology of the switching fabric using other mechanisms.

At the optional process 670, the switching fabric is monitored. In some examples, the provisioning system may monitor the switching fabric to identify imbalances in utilization of one or more of the front panel cards and/or one or more of the fabric cards. In some examples, when the imbalance is detected, the provisioning system may dynamically reprovision the switching fabric by returning to process 610 and providing a new desired configuration. In some examples, the provisioning system may monitor the switching fabric to determine whether one or more of the front panel cards and/or one or more of the fabric cards are not available (e.g., down, rebooting, removed, etc.). In some examples, when one or more of the front panel cards and/or one or more of the fabric cards are not available, the provisioning system may dynamically reprovision the switching fabric by returning to process 610 and providing a new desired configuration. In some examples, the provisioning system may receive one or more commands and/or instructions from a network operator and/or a network controller with an updated configuration. In some examples, when the updated configuration is received, the provisioning system may dynamically reprovision the switching fabric by returning to process 610 and providing the updated configuration.

Some embodiments of process 600 may be implemented using non-transient, tangible, machine readable media that include executable code that when run by one or more processors may cause the one or more processors to perform the processes of method 600 as described above. Some common forms of machine readable media that may include the embodiments of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching device comprising:
 a plurality of connectors configured to couple the network switching device to other network devices;
 one or more front panel cards, each of the front panel cards including one or more first ports and configured to forward network packets between the first ports;
 one or more fabric cards, each of the fabric cards including one or more second ports and configured to forward network packets between the second ports; and
 a port multiplexing unit comprising:
  one or more external connector connection points connecting the port multiplexing unit to the connectors;
  one or more front panel connection points connecting the port multiplexing unit to the one or more first ports; and
  one or more fabric card connection points connecting the port multiplexing unit to the one or more second ports;
 wherein the port multiplexing unit is configured to:
  flexibly interconnect the external connector connection points to the front panel connection points; and
  flexibly interconnect the fabric card connection points to the front panel connection points.

2. The network switching device of claim 1, further comprising a unified provisioning system configured to provision the port multiplexing unit.

3. The network switching device of claim 2 wherein the unified provisioning system is configured to:
determine a desired configuration for the network switching device;
determine first mappings between the plurality of connectors and the one more first ports based on information associated with the desired configuration;
determine second mappings between the one or more first ports and the one or more second ports based on information associated with the desired configuration; and
provision the port multiplexing unit based on the first mappings and the second mappings.

4. The network switching device of claim 3 wherein the unified provisioning system is further configured to:
determine third mappings between the plurality of connectors, between the one more first ports, or between the one or more second ports based on information associated with the desired configuration; and
further provision the port multiplexing unit based on the third mappings.

5. The network switching device of claim 3 wherein the desired configuration is based on one or more switching fabric characteristics selected from a group consisting of an oversubscription ratio and downlink and uplink capabilities.

6. The network switching device of claim 2 wherein the unified provisioning system is coupled to the front panel cards and the fabric cards.

7. The network switching device of claim 2 wherein one of the one or more fabric cards includes the unified provisioning system.

8. The network switching device of claim 1 wherein the network switching device is part of a chassis.

9. The network switching device of claim 1 wherein the port multiplexing unit is coupled to the connectors, the first ports, and the second ports using one or more devices selected from a group consisting of a backplane, a midplane, a connector, and a cable.

10. The network switching device of claim 1 wherein the port multiplexing unit includes a crossbar switch.

11. The network switching device of claim 1 wherein the port multiplexing unit includes one or more port multiplexors.

12. The network switching device of claim 11 wherein each of the one or more front panel cards is coupled to one or more corresponding port multiplexors selected from the one or more port multiplexors.

13. The network switching device of claim 1 wherein each of the one or more front panel cards and each of the one or more fabric cards operate autonomously.

14. The network switching device of claim 1 wherein a number of all of the first ports is equal to or less than a sum of a number of the plurality of connectors and a number of all of the second ports.

15. A method of configuring a network switching device, the method comprising:
determining a desired configuration for the network switching device;
determining first mappings between a plurality of connectors configured to couple the network switching device to other network devices and one more first ports of one or more front panel cards based on information associated with the desired configuration;
determining second mappings between the one or more first ports and one or more second ports of one or more fabric cards based on information associated with the desired configuration; and
provisioning a port multiplexing unit based on the first mappings and the second mappings, the port multiplexing unit comprising:
one or more external connector connection points connecting the port multiplexing unit to the connectors;
one or more front panel connection points connecting the port multiplexing unit to the one or more first ports; and
one or more fabric card connection points connecting the port multiplexing unit to the one or more second ports;
wherein the provisioned port multiplexing unit flexibly interconnects the external connector connection points to the front panel connection points based on the first mappings and flexibly interconnects the fabric card connection points to the front panel connection points based on the second mappings.

16. The method of claim 15, further comprising:
determining third mappings between the plurality of connectors, between the one more first ports, or between the one or more second ports based on information associated with the desired configuration; and
further provisioning the port multiplexing unit based on the third mappings.

17. The method of claim 15 wherein the desired configuration is based on one or more switching fabric characteristics selected from a group consisting of an oversubscription ratio and downlink and uplink capabilities.

18. The method of claim 15, further comprising transmitting flow control messages to the front panel cards and the fabric cards to control forwarding of network packets in the front panel cards and the fabric cards.

19. The method of claim 15, further comprising:
monitoring network traffic through the network switching device; and
reprovisioning the port multiplexing unit based on the monitored network traffic.

20. An information handing system comprising:
a network switching device comprising:
a plurality of connectors configured to couple the network switching device to other network devices;
one or more front panel cards, each of the front panel cards including one or more first ports and configured to forward network packets between the first ports;
one or more fabric cards, each of the fabric cards including one or more second ports and configured to forward network packets between the second ports;
a port multiplexing unit comprising:
one or more external connector connection points connecting the port multiplexing unit to the connectors;
one or more front panel connection points connecting the port multiplexing unit to the one or more first ports; and
one or more fabric card connection points connecting the port multiplexing unit to the one or more second ports; and
a unified provisioning system configured to provision the port multiplexing unit;
wherein the unified provisioning system is configured to:
determine a desired configuration for the network switching device;

determine first mappings between the plurality of connectors and the one more first ports based on information associated with the desired configuration;
determine second mappings between the one or more first ports and the one or more second ports based on information associated with the desired configuration; and
provision the port multiplexing unit based on the first mappings and the second mappings;
wherein the provisioned port multiplexing unit flexibly interconnects the external connector connection points to the front panel connection points based on the first mappings and flexibly interconnects the fabric card connection points to the front panel connection points based on the second mappings.

* * * * *